US010469489B2

United States Patent
Kao

(10) Patent No.: US 10,469,489 B2
(45) Date of Patent: *Nov. 5, 2019

(54) SYSTEMS AND METHODS FOR SIMULTANEOUS VOICE AND SOUND MULTIFACTOR AUTHENTICATION

(71) Applicant: FMR LLC, Boston, MA (US)

(72) Inventor: Jason Kao, Cary, NC (US)

(73) Assignee: FMR LLC, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/114,175

(22) Filed: Aug. 27, 2018

(65) Prior Publication Data

US 2019/0289000 A1    Sep. 19, 2019

Related U.S. Application Data

(63) Continuation of application No. 15/923,785, filed on Mar. 16, 2018, now Pat. No. 10,063,542.

(51) Int. Cl.
| | |
|---|---|
| *G06F 21/32* | (2013.01) |
| *H04L 29/06* | (2006.01) |
| *G10L 17/24* | (2013.01) |
| *G10L 15/30* | (2013.01) |
| *G10L 17/06* | (2013.01) |
| *G06F 21/34* | (2013.01) |

(52) U.S. Cl.
CPC .......... *H04L 63/0861* (2013.01); *G10L 15/30* (2013.01); *G10L 17/06* (2013.01); *G10L 17/24* (2013.01); *H04L 63/083* (2013.01); *G06F 21/32* (2013.01); *G06F 21/34* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,625,796 B1 | 1/2014 | Ayed | |
| 9,906,525 B1 | 2/2018 | Avetisov et al. | |
| 9,942,222 B1 | 4/2018 | Fenton et al. | |
| 10,187,754 B1* | 1/2019 | Hansen | G06F 21/31 |
| 2008/0307515 A1* | 12/2008 | Drokov | G06Q 20/32 |
| | | | 726/7 |
| 2011/0026716 A1 | 2/2011 | Tang et al. | |
| 2012/0019361 A1 | 1/2012 | Ayed | |
| 2013/0104203 A1 | 4/2013 | Davis et al. | |

(Continued)

*Primary Examiner* — Malcolm Cribbs
(74) *Attorney, Agent, or Firm* — Proskauer Rose LLP

(57) ABSTRACT

A computer-implemented method is described for authenticating an identity of a user requesting execution of a computerized transaction via a first client computing device. The first device and a second client computing device in proximity each execute applications for communicating with a server. The first and second devices contemporaneously capture voice sequences including at least one audible sound vocalized by the user, and a timestamp indicating when the sound is captured. The identity of the user is validated based upon a determination that the user vocalized the pass phrase, and a difference between the first timestamp and the second timestamp is below a predetermined threshold. The first device executes a computerized transaction with the server computing device upon receiving validation of the identity of the user.

20 Claims, 4 Drawing Sheets

(56) References Cited

U.S. PATENT DOCUMENTS

| | | | |
|---|---|---|---|
| 2014/0046664 A1 | 2/2014 | Sarkar et al. | |
| 2014/0099003 A1* | 4/2014 | Langley | G06K 9/00255 |
| | | | 382/115 |
| 2014/0129231 A1 | 5/2014 | Herring et al. | |
| 2015/0046990 A1 | 2/2015 | Oberheide et al. | |
| 2016/0050234 A1 | 2/2016 | Choyi et al. | |
| 2016/0072803 A1 | 3/2016 | Holz | |
| 2016/0171806 A1* | 6/2016 | Van Dyken | G06K 9/00288 |
| | | | 367/199 |
| 2017/0011406 A1 | 1/2017 | Tunnell et al. | |
| 2017/0026344 A1 | 1/2017 | Mahler | |
| 2017/0063852 A1* | 3/2017 | Azar | G06F 21/32 |
| 2017/0193212 A1* | 7/2017 | Lai | G06F 3/0488 |
| 2017/0214687 A1 | 7/2017 | Klein et al. | |
| 2017/0372549 A1 | 12/2017 | Einberg | |
| 2018/0039782 A1 | 2/2018 | Ouyang et al. | |
| 2018/0068103 A1 | 3/2018 | Pitkanen et al. | |
| 2018/0083959 A1* | 3/2018 | Barbosa | H04L 63/0853 |
| 2019/0199718 A1* | 6/2019 | Nigam | H04L 63/0861 |

* cited by examiner

SYSTEMS AND METHODS FOR SIMULTANEOUS VOICE AND SOUND MULTIFACTOR AUTHENTICATION

CROSS REFERENCE TO RELATED APPLICATION

This application is a continuation of U.S. patent application Ser. No. 15/923,785, filed Mar. 16, 2018, now U.S. Pat. No. 10,063,542, which is hereby incorporated by reference herein in its entirety.

TECHNICAL FIELD

This application relates generally to systems and methods employed in authenticating a user of a computing system. In particular, this application relates to systems and methods for simultaneous voice and sound multifactor authentication.

BACKGROUND

Implementing robust authentication protocols for managing user access to resources or services hosted by server and cloud computing environments is exceedingly difficult today. Traditional and simple methods of online authentication require a user to provide a username and password combination. These traditional methods are among the easiest to circumvent. More complex methods generally employ multiple factors of authentication, such as knowledge factors (passwords), possession factors (a code texted to a secondary device), and inherence factors (voice, face, fingerprint, etc.).

However, in an effort to enhance security, these more advanced systems typically utilize a multifactor authentication protocol that is spread out across several steps, making authentication an arduous and complicated process for users. For example, using current authentication methods, it is not unusual to encounter a first screen requiring the user to input a username and password, then subsequently having to type in a separate code that is sent to a secondary device, followed by yet another login.

These methods include laborious tasks for users, some of which are ineffective and do not improve overall security.

SUMMARY

There is therefore a need for streamlined authentication methods that simplify the authentication process yet enhance the robustness of the authentication process.

In one aspect, the technology features a computer-implemented method for authenticating an identity of a user requesting execution of a computerized transaction via a first client computing device. The first client computing device executes a first application for facilitating communication with a server computing device based on a computerized transaction requested by the user via the first client computing device. The first client computing device initiates communication with a second client computing device in proximity with the first client computing device. The second client computing device executes a second application for facilitating communication with the server computing device upon initiation of communication by the first client computing device. The first client computing device prompts the user to vocalize a pass phrase upon hearing a verification sound played by the first client computing device. The first client computing device captures a first voice sequence comprising at least one audible sound vocalized by the user from a first sensor of the first client computing device responsive to sound within a first frequency range, and a first timestamp indicating a time the first voice sequence was captured. The second client computing device captures a second voice sequence of the user from a first sensor of the second client computing device responsive to sound within the first frequency range, the second voice sequence being captured substantially contemporaneously with the first voice sequence, and (ii) a second timestamp indicating a time the second voice sequence was captured. The first client computing device transmits to the server computing device, the first voice sequence and the first timestamp. The second client computing device transmits, to the server computing device, the second voice sequence and the second timestamp. The first client computing device receives a validation of the identity of the user from the server computing device based upon a determination that the user vocalized the pass phrase, and a difference between the first timestamp and the second timestamp is below a predetermined threshold. The first client computing device executes the computerized transaction with the server computing device upon receiving validation of the identity of the user.

The above aspects can include one or more of the following features. In some embodiments, the determination that the user vocalized the pass phrase further includes a determination that the pass phrase vocalized by the user matches a predetermined pass phrase previously established by the user, and one or more properties of the first voice sequence substantially match one or more properties of the second voice sequence.

In some embodiments, the first client computing device captures a first sound sequence from the first sensor of the first client computing device, the first sound sequence comprising ambient noise present in the immediate vicinity of the first client computing device, and a third timestamp. The second client computing device captures a second sound sequence from the first sensor of the second client computing device, the second sound sequence comprising ambient noise present in the immediate vicinity of the second client computing device, and a fourth timestamp. The first client computing device transmits to the server computing device, the first sound sequence and the third timestamp. The first client computing device transmits, to the server computing device, the second sound sequence and the fourth timestamp.

In some embodiments, receiving a validation of the identity of the user from the server computing device is further based upon a determination that one or more properties of the first sound sequence substantially match one or more properties of the second sound sequence.

In some embodiments, the second client computing device detects the verification sound based on sound data obtained from the first sensor of the second client computing device. The second client computing device plays a second verification sound. The first client computing device captures a sound sequence from a second sensor of the first client computing device responsive to sound within a second frequency range, the sound sequence comprising the second verification sound. The first client computing device transmits the sound sequence to the server computing device.

In some embodiments, receiving a validation of the identity of the user from the server computing device is further based upon a determination that one or more properties of the sound sequence substantially match one or more properties of a predetermined authentication sound sequence.

In some embodiments, the second verification sound has a frequency inaudible to human ears. In some embodiments, the second sensor of the first client computing device is responsive to sound having a frequency of at least at 17 kHz. In some embodiments, the first frequency range is from about 0 Hz to about 17 kHz, and the second frequency range is from about 17 kHz to about 40 kHz.

In some embodiments, the first sensor of the first client computing device and the second sensor of the first client computing device are a single sensor responsive to sounds in the first frequency range and the second frequency range.

In some embodiments, the first client computing device detects the verification sound based on sound data obtained from the first sensor of the second client computing device. The first client computing device plays a second verification sound. The second client computing device captures a sound sequence from a second sensor of the second client computing device responsive to sound within a second frequency range, and the sound sequence includes the second verification sound. The second client computing device transmits the sound sequence to the server computing device.

In some embodiments, receiving a validation of the identity of the user from the server computing device is further based upon a determination that one or more properties of the sound sequence substantially match one or more properties of a predetermined authentication sound sequence. In some embodiments, the second verification sound has a frequency inaudible to human ears. In some embodiments, the second sensor of the second client computing device is responsive to sound having a frequency of at least at 17 kHz. In some embodiments, the first frequency range is from about 0 Hz to about 17 kHz, and the second frequency range is from about 17 kHz to about 40 kHz.

In some embodiments, the first sensor of the second client computing device and the second sensor of the second client computing device are a single sensor responsive to sounds in the first frequency range and the second frequency range.

In some embodiments, initiating communication with the second client computing device further includes the first client computing device accessing a first database comprising an authentication profiles associated with the user, the first client computing device determining one or more client computing devices capable of authenticating the user based on a credential entered by the user on the first client computing device transmitting a connection request to the one or more client computing devices.

In some embodiments, the first client computing device transmits, to the server computing device, a third timestamp indicating a time when the first client computing device played the verification sound.

In some embodiments, receiving a validation of the identity of the user from the server computing device is further based upon a determination that a difference between the first timestamp and the third timestamp is within a predetermined range. In some embodiments, receiving a validation of the identity of the user from the server computing device is further based upon a determination that the first voice sequence vocalized by the user matches one or more properties of a previously-established voice profile of the user.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

DETAILED DESCRIPTION

The described system and method for performing multi-factor authentication simultaneously utilizes three different authentication factors: possession factor, inherence factor, and a knowledge factor.

Many methods of two-factor authentication currently verify possession by asking users to interact with a secondary device such as a mobile or smart phone (e.g., to retrieve a text code, to receive a passcode via an automated call). The technology described herein provides advantages over the existing technology by employing simultaneous spoken voice recognition (e.g., recognition of spoken phrases, voice print verification) and sound verification (e.g., ambient sounds, predetermined audible and inaudible sounds) by both the primary and secondary authentication device, along with a timing verification aspect to provide a more robust system of possession verification that is exceedingly more difficult to circumvent.

The technology described herein analyzes biometric data such as properties of captured user voice sequences to verify user identity as part of the authentication process to provide an inherence factor. The described technology further employs a knowledge factor in its authorization protocol, by asking questions that only the user would know. For example, we could ask the user to answer by providing predetermined pass phrase or answers to security questions he has answered earlier.

The timing verification and biometric data analysis aspects of this technology discussed above operate in conjunction to serve as a form of Turing test to discern the difference between a human interacting with a computing system, and a machine (e.g., a computer, a computer employing artificial intelligence) that is designed to generate human-like interactions and responses.

Figure 1:
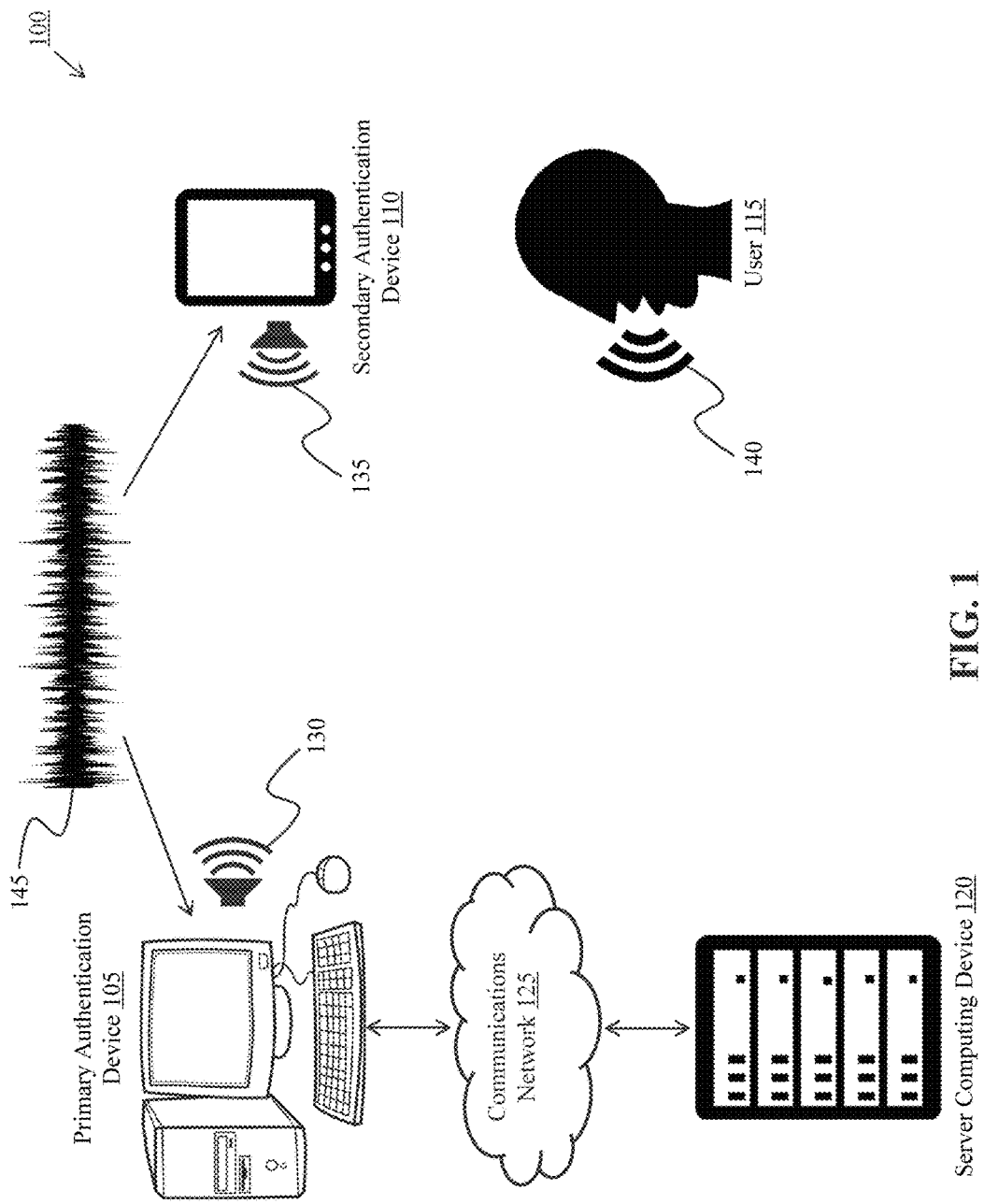
FIG. 1 is a block diagram of a computing environment for simultaneous voice and sound multifactor authentication according to embodiments of the technology described herein.

FIG. 1 is a block diagram of an exemplary computing environment 100 for performing simultaneous voice and sound multifactor authentication. Computing environment 100 includes primary authentication device 105, secondary authentication device 110, server computing device 120, and communications network 125. Generally, interactions between user 115, primary authentication device 105, secondary authentication device 110, and server computing device 120 are used to authenticate user 115 for access to resources or services hosted by server computing device 120. In some embodiments, user 115, primary authentication device 105, and secondary authentication device 110 are co-located (e.g., located in the same room, located within arm's reach of user 115).

In some embodiments, primary authentication device 105 is a personal computing device (e.g., desktop computer, laptop computer) having a processor and memory that can execute software instructions. In some embodiments, secondary authentication device 110 is a mobile computing device such as a tablet computer. One skilled in the art will be appreciate that either of primary authentication device 105 and secondary authentication device 110 can be embodied in other forms (e.g., mobile device, cellular phone, personal digital assistant device, smart phone, tablet, desktop computer, laptop computer) without departing from the scope of the technology described herein.

Primary authentication device 105 and secondary authentication device 110 can each include one or more sound transducers for sensing and generating sounds. For example, primary authentication device 105 can include a sound transducer such as a speaker or other device for producing sound for generating sound 130, and secondary authentication device 110 can include a sound transducer for generating sound 135.

Primary authentication device 105 and secondary authentication device 110 can each further include a sound transducer such as a microphone for converting sound into electrical signals that can be processed by the respective processors of primary authentication device 105 and secondary authentication device 110. For example, primary authentication device 105 can include a sound transducer for converting sound 135 produced by secondary authentication device 110, vocalized sound 140 produced by user 115, and ambient noise 145 produced by various environmental noise sources (e.g., waves, traffic noise, alarms, people talking), bioacoustic noise sources (e.g., noises generated by animals), and mechanical noise sources (e.g., noise produced by machinery such as refrigerators, air conditioners, power supplies or motors) in the vicinity of primary authentication device 105 and secondary authentication device 110. Secondary authentication device 110 can include a sound transducer for converting sound 130 produced by primary authentication device 105, vocalized sound 140, and ambient noise 145.

Primary authentication device 105 includes network-interface components to connect to communications network 125. In some embodiments, the network-interface components include components to connect to a wired network or a wireless network, such as a Wi-Fi or cellular network, in order to access a wider network, such as the Internet. Communications network 125 can be a local network, such as a LAN, or a wide area network ("WAN"), such as the Internet and/or a cellular network. Communications network 125 can alternatively comprise components of both a LAN and a WAN, or any other type of network known in the art.

Communications network 125 facilitates communications between primary authentication device 105 and server computing device 120. Server computing device 120 can include a combination of hardware and software modules for authenticating user 115 for access to resources or services hosted by server computing device 120. For example, server computing device 120 can host a website or provide access to an application that requests authentication of user 115. In some embodiments, server computing device 120 includes one or more server computing devices and databases associated with an organization (e.g., online retailer, educational institution, financial institution, SAAS-provider).

In some embodiments, secondary authentication device 110 is in communication with communications network 125, and primary authentication device 105 is in communication with secondary authentication device 110 via communications network 125. In some embodiments, primary authentication device 105 is in communication with secondary authentication device 110 via a second communications network, a near field connection, or other wired or wireless communication connection.

Figure 2:
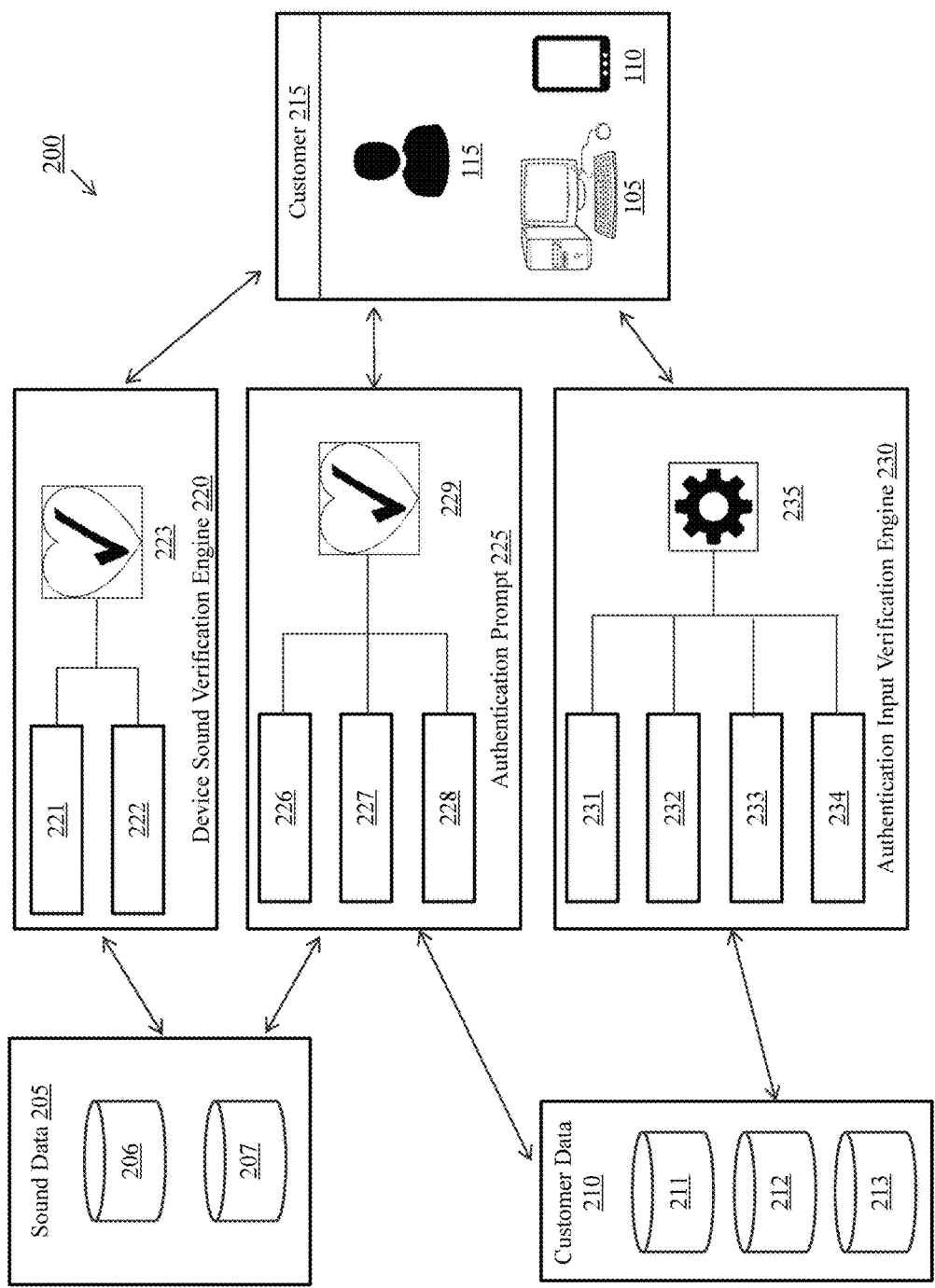
FIG. 2 is a detailed block diagram of a system for simultaneous voice and sound multifactor authentication according to embodiments of the technology described herein.

FIG. 2 is a detailed block diagram of an exemplary computing environment 200 for performing simultaneous voice and sound multifactor authentication. Computing environment 200 includes customer 215 which is defined by three main components: primary authentication device 105, secondary authentication device 110, and user 115, as described above. These three components work in tandem to implement simultaneous voice and sound multifactor authentication Computing environment 200 includes certain data and computing components necessary for the described simultaneous voice and sound multifactor authentication scheme to operate. The data can be categorized as sound data 205, which does not uniquely identify user 115, and customer data 210, which is particular to user 115, and can uniquely identify user 115.

Sound data 205 can comprise one or more databases including audio files for generating sounds and voice prompts used during the simultaneous voice and sound multifactor authentication process. In some embodiments, sound data 205 includes trigger sounds database 206 for storing sound triggers that are played by primary authentication device 105 to prompt user 115 for various input required for authentication. For example, trigger sounds database 206 can include a recorded voice prompt instructing user 115 to speak after hearing the tolling of a bell, and a sound file for reproducing the tolling of a bell.

Sound data 205 can also include inaudible sounds database 207 containing audio files for generating sounds that are inaudible to human ears (e.g., sounds at frequencies outside of the normal human-audible range), but that can nonetheless be detected and verified by primary authentication device 105 and/or secondary authentication device 110. In some embodiments, inaudible sounds database 207 includes audio files for generating sounds that are designed to be non- or minimally-intrusive or obstructive to human hearing. In some embodiments, primary authentication device 105 can play a sound from inaudible sounds database 207 that is inaudible to human ears, but can be captured by secondary authentication device 110 and validated to ensure it matches an expected sound wave. In some embodiments, upon receiving or validating the inaudible sound produced by primary authentication device 105, secondary authentication device 110 plays back the same or a different inaudible sound that is validated by primary authentication device 105.

Customer data 210 can comprise one or more databases including textual and audio data relating to particular users of computing environment 200. In some embodiments, customer data 210 includes voice profiles database 211 for storing various pre-recorded audio files of users' voices that are used, in part, in the authentication process. For example, a voice recording captured during an authentication attempt by user 115 can be compared to one or more pre-recorded audio files of user 115's voice stored in voice profiles database 211 to determine whether a match exists.

Customer data 210 can also include device profile database 212 for storing information about devices each user has selected for use in the simultaneous voice and sound multifactor authentication process. For example, device profile database 212 can include information (e.g., device IDs, MAC addresses, serial numbers, etc.) about a pair of devices that user 115 has associated or paired for the purposes of authentication (e.g., primary authentication device 105 and secondary authentication device 110).

Customer data 210 can further include knowledge profile database 213 for storing a list of questions and their associated pre-entered answers for use in the simultaneous voice and sound multifactor authentication process. For example, user 115 can be asked a series of security questions upon initial registration or enrollment with the resource or service hosted by server computing device 120, and knowledge profile database 213 can store the answers to the security questions and associate them with user 115 based on information about user 115 (e.g., user ID, name, etc.).

In some embodiments, one or both of sound data 205 and customer data 210 are databases integrated in or in connection with server computing device 120. In some embodiments, one or both of sound data 205 and customer data 210 are databases integrated in or in connection with primary authentication device 105, and primary authentication device 105 includes a combination of audio processing hardware and software to verify the audible responses by the user and the other sounds processed by the authentication system (e.g., sounds played by secondary authentication device 110, ambient noise, etc.).

In some embodiments, user 115 performs an initial registration or enrollment the first time user 115 attempts to access a resource or service hosted by server computing device 120. In some embodiments, user 115 is prompted to do one or more of the following during the initial registration process: record at least one voice sample, associate two computing devices to be used for authentication (e.g., a primary authentication device and a secondary authentication device), and provide a response for at least one security question.

Computing environment 200 further includes authentication prompt 225 made up of authentication prompt generator 229 for generating one or more authentication prompts to the user (e.g., user 115) based on certain data inputs from three computing resources: initial prompt generator 226, primary device sound generator 227, and secondary device sound generator 228.

Authentication prompt generator 229 facilitates the generation of instructions that are displayed on primary authentication device 105 for prompting user 115's authentication attempt. Initial prompt generator 226 draws data from knowledge profile database 213 and primary device sound generator 227 draws data from trigger sounds database 206 to generate prompts to solicit responses from a user during the authentication process.

In one example, based on data from initial prompt generator 226 and primary device sound generator 227, authentication prompt generator 229 displays or audibly plays the prompt, "After you hear sound S, please say your answer to the following question: Q," where S is a sound stored on trigger sounds database 206, and Q is a security question that user 115 has provided an answer for in knowledge profile database 213. The expected answer A is the corresponding answer to question Q stored in knowledge profile database 213 that only the user should know. Further, authentication prompt 225 can cause primary authentication device 105 to play a sequence of sounds, one of which is sound S at a random point in time after question Q is displayed or played aloud.

In some embodiments, primary device sound generator 227 draws data from inaudible sounds database 207 and primary authentication device 105 is configured to play an inaudible sound during the authentication process that it expects secondary authentication device 110 to reproduce during the authentication process. In some embodiments, primary authentication device 105 plays the inaudible sound at substantially the same time as, or simultaneously with, sound S.

In some embodiments, based on data that secondary device sound generator 228 draws from trigger sounds database 206, authentication prompt generator 229 causes secondary authentication device 110 to play a sequence of sounds, one of which is sound S at a random point in time after question Q is displayed. In some embodiments, based on data that secondary device sound generator 228 draws from inaudible sounds database 207, authentication prompt generator 229 causes secondary authentication device 110 to play an inaudible sound that it expects primary authentication device 105 to reproduce during the authentication process.

Computing environment 200 includes device sound verification engine 220 made up of sound verification 223 for verifying that primary authentication device 105 and secondary authentication device 110 are co-located during the authentication process, and that both are verified devices. For example, based on input from trigger sound verification 221 and inaudible sound verification 222, sound verification 223 can determine whether the respective authentication devices (e.g., primary authentication device 105, secondary authentication device 110) played back the correct audible or inaudible sound in response to the other device playing such a sound. Device sound verification engine 220 can also determine whether both authentication devices are co-located based on a comparative analysis of a sample of ambient noise 145 captured by primary authentication device 105 and a sample of ambient noise 145 that secondary authentication device 110 captures and transfers to primary authentication device 105 for processing by device sound verification engine 220.

Computing environment 200 further includes authentication input verification engine 230 made up of authentication verification 235 for determining whether a user has been successfully authenticated by the simultaneous voice and sound multifactor authentication process. Authentication verification 235 takes input from knowledge/answer verification 231 to determine whether each answer provided by user 115 matches the saved answer from knowledge profile database 213. Authentication verification 235 takes input from device verification 232 to determine whether each authentication device is part of a verified pair of authentication devices stored in device profile database 212. Authentication verification 235 takes input from voice verification 233 to determine whether a sample of user 115's voice captured during the authentication process matches voice data for user 115 stored in voice profiles database 211. Independent of verifying user 115's identity based on a captured sample of user 115's voice, authentication verification 235 can further verify that the voice sequence vocalized by user 115 during the authentication process matches the phrase that user 115 was prompted to utter. Finally, authentication verification 235 takes input from timing verification 234 to determine whether the timing of each response from user 115 matches the timing requested by authentication prompt generator 229.

Figure 3:
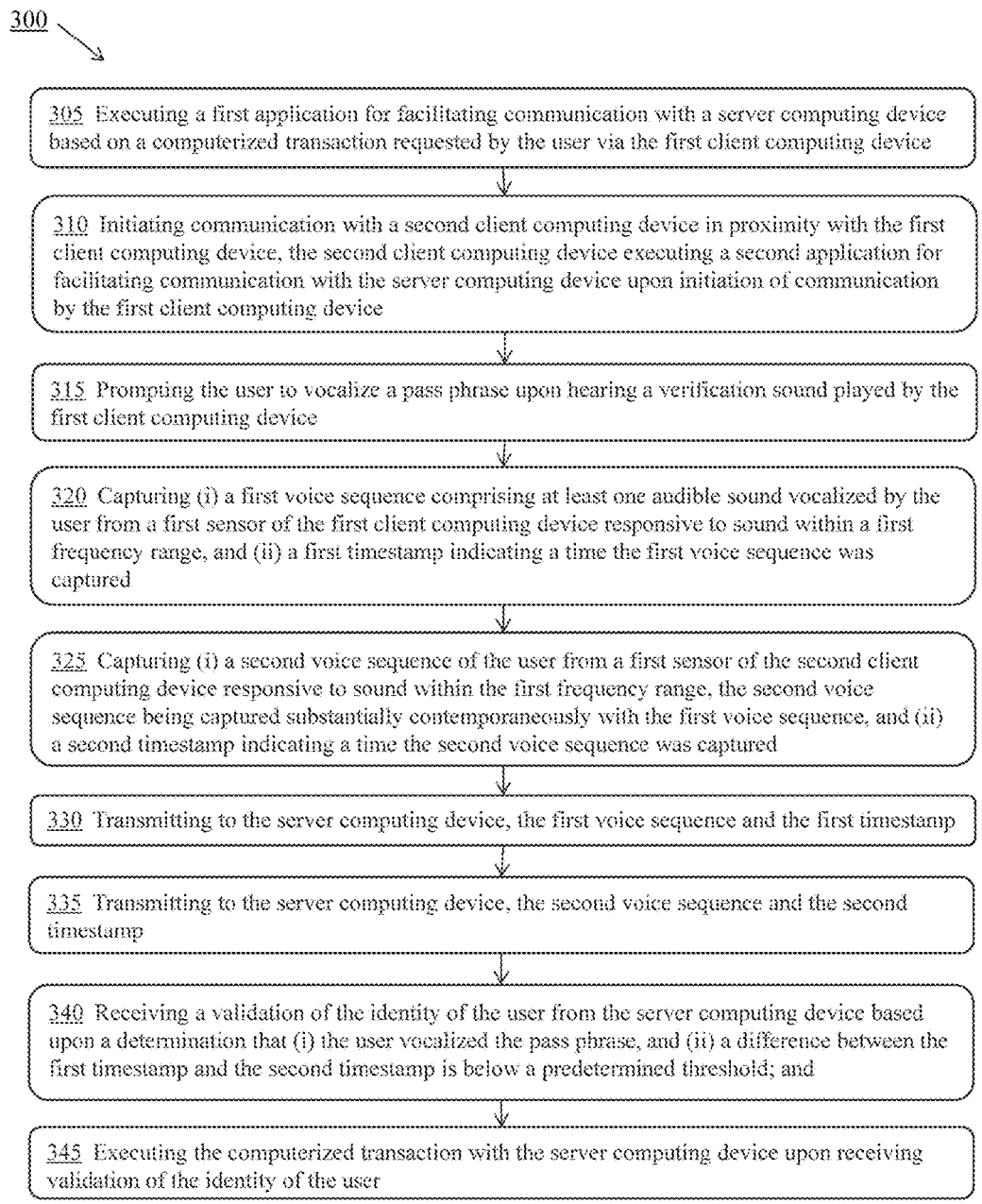
FIG. 3 is a flow diagram of a method for simultaneous voice and sound multifactor authentication according to embodiments of the technology described herein.

FIG. 3 is a flow diagram of a method 300 for simultaneous voice and sound multifactor authentication. In particular, FIG. 3 shows a computer-implemented method for authenticating an identity of a user requesting execution of a computerized transaction via a first client computing device (e.g., primary authentication device 105). The first client computing device executes (305) a first application for facilitating communication with a server computing device based on a computerized transaction requested by the user via the first client computing device. For example, based on a desired resource or service user 115 would like to access or utilize on server computing device 120, an application can be executed on primary authentication device 105 to initiate and facilitate communication with server computing device 120 over communications network 225. In some embodiments, the application to initiate communication with server computing device 120 is a web-based application or applet executed on a webpage accessed by primary authentication device 105 over communications network 225.

The first client computing device initiates (310) communication with a second client computing device in proximity with the first client computing device, the second client computing device executing a second application for facilitating communication with the server computing device upon initiation of communication by the first client computing device.

In one example, based on information obtained from device profile database 212 (e.g., a credential of user 115, a user ID of user 115), primary authentication device 105 can identify secondary authentication device 110 as a device that has been associated or paired with primary authentication device 105 for the purposes of authentication. In some embodiments, primary authentication device 105 can be associated or paired with several different secondary authentication devices, and can substantially simultaneously send a connection request to attempt to connect to one or more of them.

Primary authentication device 105 can initiate communication with secondary authentication device 110 via a wireless network to which both devices are connected, or directly via a near field or other short-range communications technology. In some embodiments, primary authentication device 105 and secondary authentication device 110 are both connected to communications network 225, and primary authentication device 105 can initiate communication with secondary authentication device 110 via communications network 225.

In some embodiments, initiation of communication with secondary authentication device 110 triggers secondary authentication device 110 to execute an authentication application. In some embodiments, primary authentication device 105 prompts the user to execute the authentication application on secondary authentication device 110. In some embodiments, the authentication application executing on secondary authentication device 110 facilitates communicates between secondary authentication device 110 and server computing device 120 via communications network 225, or indirectly via communications routed through primary authentication device 105.

The first client computing device prompts (315) the user to vocalize a pass phrase upon hearing a verification sound played by the first client computing device. For example, based on data and files obtained from the one or more databases of sound data 205 (e.g., trigger sounds database 206), authentication prompt generator 229 can cause primary authentication device 105 to play audio voice prompts instructing user 115 on the expected authentication input and timing (e.g., "Say 'OK' after you hear a car horn."). In some embodiments, primary authentication device 105 can play an audio file prompting user 115 to vocalize a sound or pass phrase that user 115 has selected in advance (e.g., "Say your secret pass phrase after you hear a car horn."). In one example, authentication prompt generator 229 can prompt user 115 with a security question that user 115 has previously provided an answer for, as described above in reference to FIG. 2.

After instructing user 115 via the voice prompt, authentication prompt 225 can cause primary authentication device 105 to play a sequence of sounds, one of which is the sound that user 115 has been instructed to react to by vocalizing a response.

The first client computing device captures (320) (i) a first voice sequence comprising at least one audible sound vocalized by the user from a first sensor of the first client computing device responsive to sound within a first frequency range, and (ii) a first timestamp indicating a time the first voice sequence was captured. For example, using a sound transducer such as a microphone, primary authentication device 105 can capture one or more sounds or phrases vocalized by user 115 in response to the sounds played by authentication prompt 225, and store them as an audio file. The microphone used by primary authentication device 105 can be responsive to audio signals within a first frequency range (e.g., a frequency that is audible to the average human). Further, primary authentication device 105 can capture a timestamp indicating a time that user 115 vocalized a response to the generated audio prompt. In some embodiments, one or more timestamps are captured during the audio prompt to denote the start and/or stop times of each sound of a sequence of sounds played by primary authentication device 105.

The second client computing device captures (325) (i) a second voice sequence of the user from a first sensor of the second client computing device responsive to sound within the first frequency range, the second voice sequence being captured substantially contemporaneously with the first voice sequence, and (ii) a second timestamp indicating a time the second voice sequence was captured. For example, at substantially the same time that primary authentication device 105 is capturing the first voice sequence, secondary authentication device 110 can use a sound transducer such as a microphone to capture the one or more sounds or phrases vocalized by user 115 in response to the sounds played by authentication prompt 225, and store them as an audio file. The microphone used by secondary authentication device 110 can be responsive to audio signals within the first frequency range. Further, secondary authentication device 110 can capture a timestamp indicating a time that user 115 vocalized a response to the generated audio prompt. In some embodiments, secondary authentication device 110 captures one or more timestamps during the audio prompt to denote the start and/or stop times of each sound of a sequence of sounds played by primary authentication device 105.

In some examples, the authentication process further includes primary authentication device 105 and secondary authentication device 110 performing a system time or clock synchronization prior to capturing timestamps, as described above.

The first client computing device transmits (330) the first voice sequence and the first timestamp to the server computing device. The second client computing device transmits (335) the second voice sequence and the second timestamp to the server computing device. In some embodiments, primary authentication device 105 transmits the first voice sequence and one or more timestamps it captured to server computing device 120 via its connection to communications network 225, and secondary authentication device 110 likewise transmits the second voice sequence and one or more timestamps it captured to server computing device 120 via its connection to communications network 225. In some embodiments, secondary authentication device 110 first transmits the second voice sequence and one or more timestamps it captured to primary authentication device 105, which then forwards them to server computing device 120 via its connection to communications network 225.

The first client computing device receives (340) a validation of the identity of the user from the server computing device based upon a determination that (i) the user vocalized the pass phrase, and (ii) a difference between the first timestamp and the second timestamp is below a predetermined threshold.

As described above in connection with FIG. 2, components of authentication input verification engine 230 can be used to perform various aspects of the authentication process based on analysis of the first and/or second voice sequences captured by primary authentication device 105 and secondary authentication device 110, respectively. For example, authentication input verification engine 230 can use speech recognition techniques to verify that the captured pass phrase vocalized by user 115 matches the phrase that user 115 was prompted to utter (e.g., a specific word or phrase, a pass phrase known only to user 115). Further, authentication input verification engine 230 can analyze one or more properties or aspects (e.g., accent, pronunciation, articulation, roughness, nasality, pitch, volume, and speed) of the first and/or second voice sequences of user 115's voice captured during the authentication process to determine whether one or more of those aspects match those of prerecorded voice data for user 115 stored in voice profiles database 211.

In addition, timing verification 234 can analyze the timestamps captured by primary authentication device 105 and secondary authentication device 110 to determine whether the timing of each response from user 115 substantially matches. In this way, it can be determined that primary authentication device 105 and secondary authentication device 110 are collocated at the time of the authentication attempt. Timing verification 234 can also analyze the timestamps to determine that the captured pass phrase was uttered substantially at the requested moment (e.g., after primary authentication device 105 played the sound of a car horn).

Authentication verification 235 receives inputs from each module or engine that is implicated by the type of authentication attempt and determines whether the identity of user 115 has been validated based on those inputs. For example, if authentication verification 235 receives input from voice verification 233 indicating that the captured voice sequences substantially match the requested pass phrase, and that the voice sequences were captured substantially simultaneously, authentication verification 235 determines that the identity of user 115 has been authenticated.

The first client computing device executes (345) the computerized transaction with the server computing device upon receiving validation of the identity of the user. Upon validation of the identity of user 115, primary authentication device 105 is granted access to the desired resource or service user 115 would like to access or utilize on server computing device 120, and primary authentication device 105 and server computing device 120 can be used to execute computerized transactions securely.

The method 300 for simultaneous voice and sound multifactor authentication can include further steps to enhance the strength of its authentication capabilities. For example, in addition to capturing the first voice sequence of a sound vocalized by user 115, primary authentication device 105 can use its microphone to capture a first sound sequence comprising ambient noise 145 present in the immediate vicinity of primary authentication device 105 along with one or more additional timestamps during the capture of ambient noise 145. The microphone of secondary authentication device 110 can similarly be used to capture a second sound sequence comprising ambient noise 145 and one or more timestamps during capture of ambient noise 145.

Both primary authentication device 105 and secondary authentication device 110 can transmit the respective captured sound sequences and timestamps to server computing device 120 for processing by components of authentication input verification 230. In some examples, authentication verification 235 is further configured to base its determination of whether user 115 has been successfully authenticated on an analysis of the first and second sound sequences and respective timestamps captured by primary authentication device 105 and secondary authentication device 110. For example, components of authentication verification 235 can determine that one or more properties or aspects of the first and second sound sequences of ambient noise 145 substantially match, and further, that the one or more properties or aspects of the first and second sound sequences occurred at substantially the same time.

In some embodiments, upon detection by secondary authentication device 110 of the verification sound played by primary authentication device 105, secondary authentication device 110 plays a second verification sound that is captured by a second sensor of primary authentication device 105 that is responsive to sound having a different frequency range than the first verification sound. For example, the second verification sound can have a frequency that makes it substantially inaudible to human ears. In some embodiments, the second sensor of primary authentication device 105 is responsive to sound having a frequency substantially equal to sound within the first frequency range. In some embodiments, the second sensor of primary authentication device 105 is responsive to sound having a frequency of at least 17 kHz. In one example, the frequency of the first verification sound is in the range of about 0 Hz to about 17 kHz, and the frequency of the second verification sound is in the range of about 17 Hz to about 40 kHz. In some examples, the first and second sensors are a single sensor responsive to sounds in the first and the second frequency range. In some examples, secondary authentication device 110 also includes either an additional sensor responsive to sound in the second frequency range, or its sensor is responsive to sound in both the first and second frequency ranges.

Upon capturing the second verification sound, primary authentication device 105 can transmit an audio file representing the second verification sound to server computing device 120 for processing as part of the authentication method. For example, components of device sound verification engine 220 can determine whether the second verification sound matches an expected predetermined verification sound as part of the authentication protocol. Further, the capture and verification can occur substantially simultaneously with the verification of the captured voice sequences detailed above, effectively providing a more robust authentication scheme with no additional delay to user 115.

In some examples, primary authentication device 105 captures a third timestamp corresponding to the time secondary authentication device 110 plays the second verification sound, and part of the authentication protocol includes determining that the difference between the first time stamp and the third time stamp is within a predetermined range (e.g., one or more seconds apart, less than one second apart, etc.).

Figure 4:
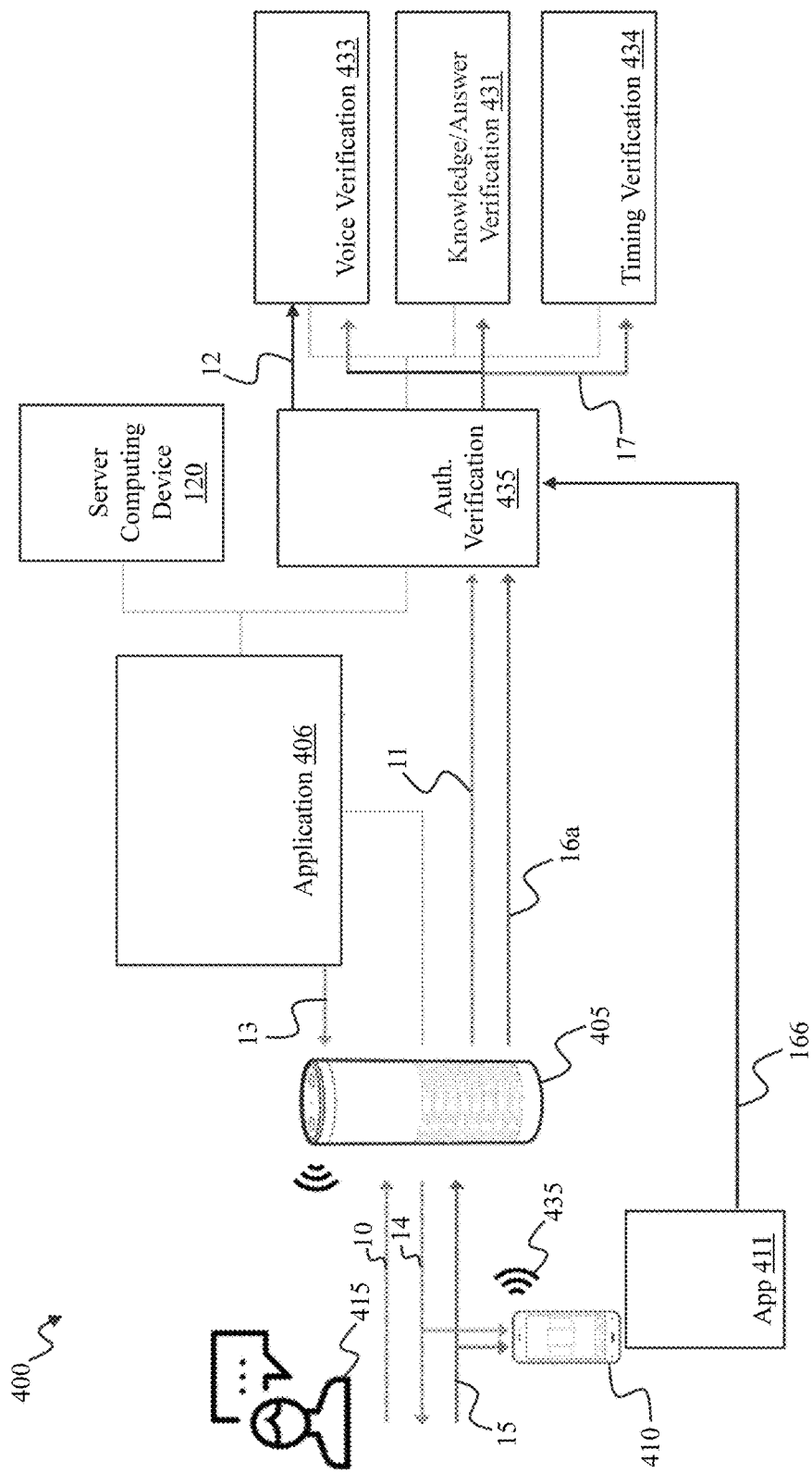
FIG. 4 is a flow diagram of an exemplary embodiment of a computing environment for simultaneous voice and sound multifactor authentication according to embodiments of the technology described herein.

FIG. 4 is a flow diagram 400 of an exemplary embodiment of a computing environment for simultaneous voice and sound multifactor authentication according to embodiments of the technology described herein. In this example primary authentication device 405 is a device employing Alexa Voice Services from Amazon.com, Inc. At step 10, user 415 executes an application 406 on primary authentication device 405 to complete a desired computerized transaction via server computing device 420. For example, user 415 invokes an Alexa skill by saying, "Alexa, open ACME Bank Billpay." Upon execution of the skill, user 415 says, "Pay $50 to my American Express card ending in 1005."

User 415's voice command activates application 406, and is also captured by primary authentication device 405 and transmitted to authentication verification 435 (step 11) to be analyzed by voice verification 433 (step 12), assuming user 415 has been previously enrolled for authentication and has a sample voice print on file in the system. Voice verification 433 can be a voice print biometrics engine such as Nuance FreeSpeech.

At step 13, application 406 generates a voice prompt to instruct user 415 on how to interact with the authentication application. For example, user 415 is prompted to have secondary authentication device 410 within proximity of primary authentication device 405: "Please make sure your mobile device with phone number ending in 2988 nearby and is able to hear you speak."

At step 14, primary authentication device 405 activates app 411 on secondary authentication device 410 based on a voice prompt by Alexa. For example, secondary authentication device 110 can be an Apple iPhone device with Siri enabled in always listen mode, and primary authentication device 405 can cause Siri to execute app 411. Further at step 14, Alexa will continue performing the authentication protocol and will prompt a response from user 415, for example, "Say 'OK' after you hear a car horn." Alexa then plays a random series of sounds, one of which is the car horn, with a small interval of silence in between each sound. Alternatively, at step 14 Alexa can prompt user 415 to "Say your pass phrase after you hear a car horn." This will trigger the optional pass phrase verification by knowledge/answer verification 431.

At step 15, when user 415 hears the sound identified by Alexa (e.g., a car horn), user 415 says, "OK," or alternatively speaks a pass phrase. The vocalized response by user 415 is captured by both primary authentication device 405 and secondary authentication device 410, and each device also captures a corresponding time stamp.

At step 16a, primary authentication device 405 sends its capture of user 415's vocalized response and time stamp to authentication verification 435, and at step 16b, secondary authentication device 410 sends its capture of user 415's vocalized response and time stamp to authentication verification 435. At step 17, authentication verification 435 utilizes voice verification 433, knowledge/answer verification 431, and timing verification 434 to validates that the captured vocalized responses match, and that the timestamps are within reasonable time interval of each other (e.g. within one second of each other). Optionally, if a pass phrase was spoken, it is also validated against data in a predefined profile of user 415.

As discussed above in reference to FIG. 3, for added security, primary authentication device 405 and secondary authentication device 410 can exchange a sound sequence having a frequency that is inaudible to human ears, and the sound sequence captured by each device can be validated to ensure it matches the sound sequence that was generated. In one example, primary authentication device 405 and secondary authentication device 410 encode data into a series of audible and/or inaudible near-ultrasonic tones to form a "sonic barcode," such as the chirp.io technology.

Accordingly, as illustrated by reference to exemplary embodiments, the technology described herein provides a simpler and more robust method of authenticating a user over existing technologies. By combining the capture and verification of authentication factors, the method provides a simultaneous voice and sound multifactor authentication protocol that is simplified by only requiring the user to perform a single input step, but which still accounts for multiple authentication factors including possession, inherence, and knowledge. Further, the authentication method described herein includes a timed response factor that allows it to also serve as a Turing test.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A computer-implemented method for authenticating an identity of a user requesting execution of a computerized transaction via a first client computing device, the method comprising:

capturing, by the first client computing device, (i) a first voice sequence comprising at least one audible sound vocalized by the user from a first sensor of the first client computing device responsive to sound within a first frequency range, and (ii) a first timestamp indicating a time the first voice sequence was captured;

capturing, by a second client computing device, (i) a second voice sequence of the user from a first sensor of the second client computing device responsive to sound within the first frequency range, the second voice sequence being captured substantially contemporaneously with the first voice sequence, and (ii) a second timestamp indicating a time the second voice sequence was captured;

transmitting, by the first client computing device, to the server computing device, the first voice sequence and the first timestamp;

transmitting, by the second client computing device, to the server computing device, the second voice sequence and the second timestamp;

receiving, by the first client computing device, a validation of the identity of the user from a server computing device based upon a determination that (i) the user vocalized a pass phrase, and (ii) a difference between the first timestamp and the second timestamp is below a predetermined threshold; and executing, by the first client computing device, the computerized transaction with the server computing device upon receiving validation of the identity of the user.

2. The computer-implemented method of claim 1 further comprising:

capturing, by the first client computing device, (i) a first sound sequence from the first sensor of the first client computing device, the first sound sequence comprising ambient noise present in the immediate vicinity of the first client computing device, and (ii) a third timestamp;

capturing, by the second client computing device, (i) a second sound sequence from the first sensor of the second client computing device, the second sound sequence comprising ambient noise present in the immediate vicinity of the second client computing device, and (ii) a fourth timestamp;

transmitting, by the first client computing device, to the server computing device, the first sound sequence and the third timestamp; and transmitting, by the second client computing device, to the server computing device, the second sound sequence and the fourth timestamp.

3. The computer-implemented method of claim 1 further comprising:

detecting, by the second client computing device, the verification sound based on sound data obtained from the first sensor of the second client computing device;

playing, by the second client computing device, a second verification sound;

capturing, by the first client computing device, a sound sequence from a second sensor of the first client computing device responsive to sound within a second frequency range, the sound sequence comprising the second verification sound; and transmitting, by the first client computing device, to the server computing device, the sound sequence.

4. The computer-implemented method of claim 3 wherein the second verification sound has a frequency inaudible to human ears.

5. The computer-implemented method of claim 3 wherein sounds within the first frequency range are substantially audible to human ears, and sounds within the second frequency range are substantially inaudible to human ears.

6. The computer-implemented method of claim 3 wherein the first sensor of the first client computing device and the second sensor of the first client computing device are a single sensor responsive to sounds in the first frequency range and the second frequency range.

7. The computer-implemented method of claim 1 further comprising:

detecting, by the first client computing device, the verification sound based on sound data obtained from the first sensor of the second client computing device;

playing, by the first client computing device, a second verification sound;

capturing, by the second client computing device, a sound sequence from a second sensor of the second client computing device responsive to sound within a second frequency range, the sound sequence comprising the second verification sound; and transmitting, by the second client computing device, to the server computing device, the sound sequence.

8. The computer-implemented method of claim 7 wherein the receiving the validation of the identity of the user from the server computing device is further based upon a determination that one or more properties of the sound sequence substantially match one or more properties of a predetermined authentication sound sequence.

9. The computer-implemented method of claim 7 wherein the second verification sound has a frequency inaudible to human ears.

10. The computer-implemented method of claim 7 wherein sounds within the first frequency range are substantially audible to human ears, and sounds within the second frequency range are substantially inaudible to human ears.

11. The computer-implemented method of claim 7 wherein the first sensor of the second client computing device and the second sensor of the second client computing device are a single sensor responsive to sounds in the first frequency range and the second frequency range.

12. The computer-implemented method of claim 1 wherein initiating communication with the second client computing device further comprises:

accessing, by the first client computing device, a first database comprising an authentication profiles associated with the user;

determining, by the first client computing device, one or more client computing devices capable of authenticating the user based on a credential entered by the user on the first client computing device; and transmitting, by the first client computing device, a connection request to the one or more client computing devices.

13. The computer-implemented method of claim 1 further comprising:

transmitting, by the first client computing device, to the server computing device, a third timestamp indicating a time when the first client computing device played the verification sound.

14. The computer-implemented method of claim 13 wherein receiving the validation of the identity of the user from the server computing device is further based upon a determination that a difference between the first timestamp and the third timestamp is within a predetermined range.

15. A computer-implemented method for verifying collocation of a first client computing device and a second client computing device, the method comprising:

capturing, by the first client computing device, (i) a first sound sequence by a first sensor of the first client computing device responsive to sound within a first frequency range, the first sound sequence comprising at least one audible sound present in the immediate vicinity of the first client computing device, and (ii) a first timestamp indicating a time the first sound sequence was captured;

capturing, by the second client computing device, (i) a second sound sequence by a first sensor of the second client computing device responsive to sound within the first frequency range, the second sound sequence computing device responsive to sound within the first frequency range, the second sound sequence being captured substantially contemporaneously with the first sound sequence, and (ii) a second timestamp indicating a time the second sound sequence was captured;

transmitting, by the first client computing device, to the server computing device, the first sound sequence and the first timestamp;

transmitting, by the second client computing device, to the server computing device, the second sound sequence and the second timestamp;

receiving, by the first client computing device, a verification from a server computing device that the first client computing device and the second client computing device are collocated based upon a determination that (i) one or more properties of the first sound sequence substantially match one or more properties of the second sound sequence, and (ii) a difference between the first timestamp and the second timestamp is below a predetermined threshold.

16. The computer-implemented method of claim 15 wherein the first sound sequence and the second sound sequence each comprise ambient noise.

17. The computer-implemented method of claim 15 wherein the first sound sequence and the second sound sequence each comprise at least one audible sound vocalized by the user.

18. The computer-implemented method of claim 15 further comprising:

detecting, by the second client computing device, a verification sound played by the first client computing device based on sound data obtained from the first sensor of the second client computing device;

playing, by the second client computing device, a second verification sound;

capturing, by the first client computing device, a third sound sequence from a second sensor of the first client computing device responsive to sound within a second frequency range, the sound sequence comprising the second verification sound; and transmitting, by the first client computing device, to the server computing device, the third sound sequence.

19. The computer-implemented method of claim 18 wherein the receiving the verification from the server computing device that the first client computing device and the second client computing device are collocated is further based upon a determination that one or more properties of the third sound sequence substantially match one or more properties of a predetermined authentication sound sequence.

20. The computer-implemented method of claim 18 wherein the second verification sound has a frequency inaudible to human ears.

* * * * *